United States Patent [19]

Andersen et al.

[11] 4,065,217
[45] Dec. 27, 1977

[54] NOSE TIP LOCKING DEVICE

[75] Inventors: John A. Andersen; Gene R. Harty, both of Albuquerque, N. Mex.

[73] Assignee: The United States of America as represented by the United States Energy Research and Development Administration, Washington, D.C.

[21] Appl. No.: 744,472

[22] Filed: Nov. 24, 1976

[51] Int. Cl.² .............................................. F16B 1/00
[52] U.S. Cl. ..................... 403/24; 403/322;
403/317; 403/350; 102/49.4; 292/256.6
[58] Field of Search ...................... 403/24, 33, 42, 316,
403/317, 322, 338, 350, 348, 374; 102/49.4;
89/1.811; 292/256.6, 214

[56] References Cited

U.S. PATENT DOCUMENTS

| 2,710,384 | 6/1955 | Dupre et al. | 102/49.4 UX |
| 2,959,129 | 11/1960 | Warren | 403/42 X |
| 3,598,392 | 8/1971 | Williamson | 403/348 X |

Primary Examiner—Andrew V. Kundrat
Attorney, Agent, or Firm—Dean E. Carlson; Dudley W. King; Robert W. Weig

[57] ABSTRACT

The disclosure relates to a mechanism for releasably locking a nose tip to a vehicle utilizing a pawl and ratchet and pinion arrangement.

5 Claims, 7 Drawing Figures

NOSE TIP LOCKING DEVICE

FIELD OF THE INVENTION

The invention relates to nose tip securing devices and more particularly to a device for releasably locking a nose tip onto a vehicle so that even if the nose tip is radioactive, it may be safely attached and detached from the vehicle.

BACKGROUND OF THE INVENTION

There has been a problem with attaching and detaching radioactive nose tips containing active electronic instrumentation. There is a need for an apparatus capable of attaching and detaching common vehicle nose tips of various sizes and shapes constructed of a variety of materials, containing different kinds and amounts of electronic instrumentation, and having sundry levels and types of radioactivity.

It is desirable that such nose tips all fit a universal reentry vehicle. There should be a minimum amount of time required to interface a vehicle and a nose tip so that personnel are exposed to a radioactive nose tip for a minimum amount of time. Preferably personnel separating or attaching nose tips from vehicles are shielded from or stationed remotely from such radioactive nose tips.

At the same time, the nose tip to vehicle interface or joint must be sufficiently strong to withstand high dynamic loading during vehicle reentry from exoatmospheric conditions. The nose tip to vehicle connection also must provide reliable high quality electrical connections for electronic instrumentation in the nose tip. Such connections typically carry both low voltage and radio frequency signals.

SUMMARY OF THE INVENTION

In accordance with the present invention there is provided a mechanism for locking and releasing a nose tip to a vehicle comprising a shaft having first and second ends, the first end of the shaft comprising a ratchet and the second end of the shaft comprising a pinion. The ratchet engages a pawl which allows the former's rotation in only one direction unless the pawl and a ratchet are separated. A locking device is operably connected to the pinion.

One object of the present invention is to improve personnel safety while attaching and detaching radioactive nose tips from vehicles.

Another object of the invention is to provide easy interchangeability of nose tips for a vehicle.

One advantage of the present invention is that radioactive nose tips can be attached to and detached from vehicles with minimal exposure to personnel.

Another advantage of the present invention is that electrical connectors can be blind-mated in accordance therewith.

BRIEF DESCRIPTION OF THE DRAWINGS

Other objects and advantages in accordance with the present invention will be apparent to those skilled in the art from the following description with reference to the appended drawings wherein like numbers denote like parts and wherein.

DETAILED DESCRIPTION OF A PREFERRED EMBODIMENT OF THE INVENTION

Figure 1:
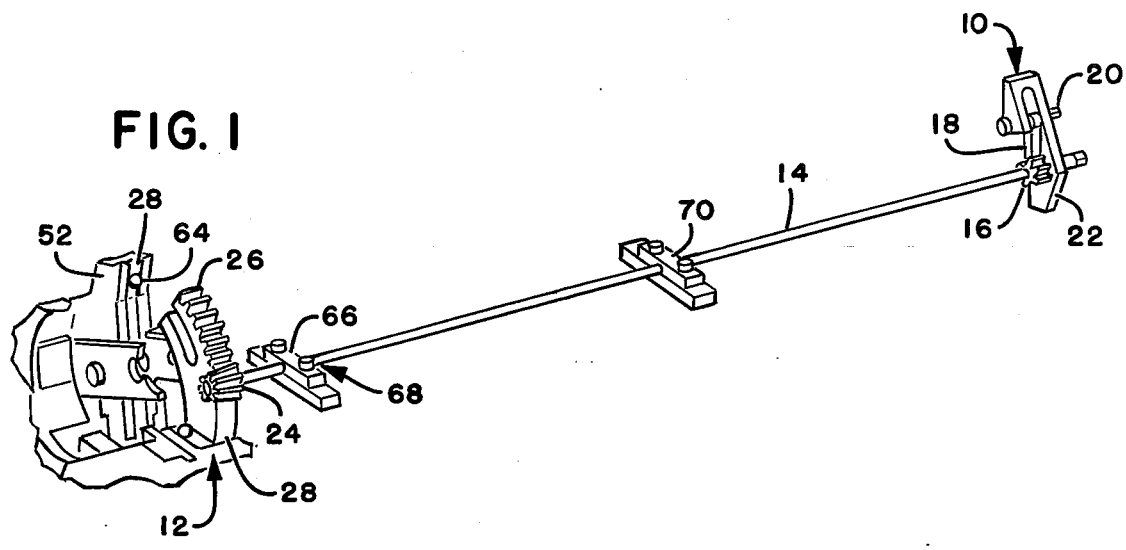
FIG. 1 is a perspective view of a portion of a nose tip locking device in accordance with the invention.

Reference is now made to FIG. 1 which shows a portion of a preferred embodiment of the invention. As shown therein, a pawl assembly 10, located in the vehicle is attached to a lock assembly 12 by a connecting torque shaft 14. Pawl assembly 10 comprises a ratchet 16, a pawl 18, a pawl shaft 20 and a support 22. Shaft 14 can be turned one way, in a first direction, without lifting pawl 18 from ratchet 16, but pawl 18 must be lifted from ratchet 16 in order for shaft 14 to be rotated in the other or second direction. The first direction is that which will lock a nose tip onto the vehicle and the second direction is that which will unlock the nose tip from the vehicle.

Figure 5A:
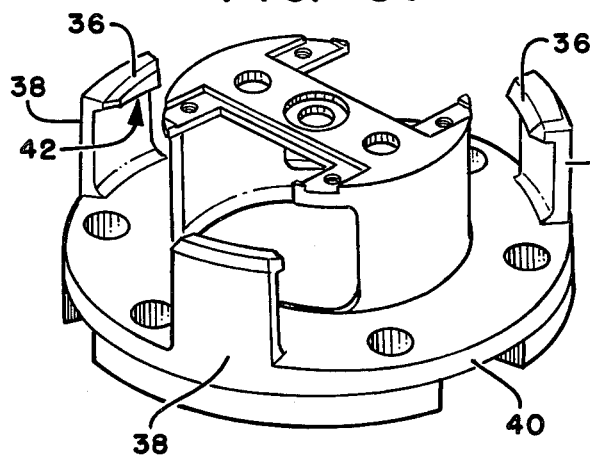
FIGS. 5a and 5b show a preferred embodiment of a vehicle to nose tip interlock mechanism.
Figure 5B:
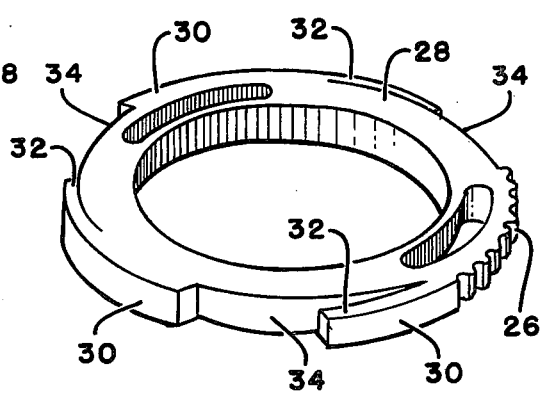

At the other end of torque shaft 14 is a pinion 24 engaged with gear teeth 26 on a lock ring 28. the disposition of teeth 26 on lock ring 28 can best be seen in FIG. 5b. Encircling interspaced portions of the lock ring 28 are beveled flanges 30, having sloped surfaces 32. Between flanges 30 about the circumference of lock ring 28 are three recessed areas 34 which allow hooks 36 on tangs 38 of a nose tip ring 40 seen in FIG. 5a to pass thereover during attachment and detachment. Beveled surfaces 42 on the underside of hooks 36 match and engage the sloped surfaces 32 on beveled flanges 30.

Figure 3:
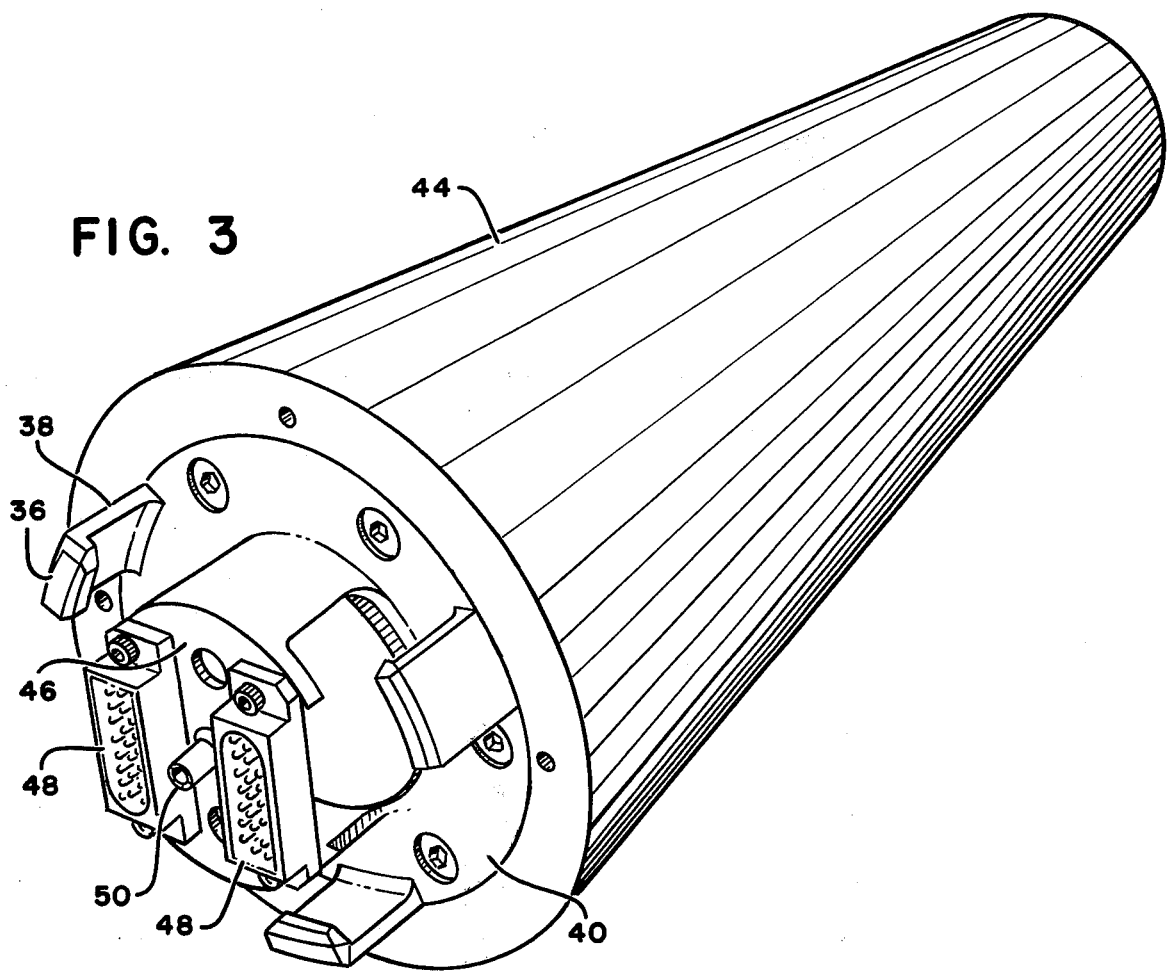
FIG. 3 shows an attachable-detachable nose tip in accordance with the invention.

FIG. 3 illustrates a nose tip assembly 44 containing nose tip ring 40. Secured to a raised platform 46 are nose tip electrical connectors 48 and a coaxial radio frequency electrical connector 50.

Figure 4:
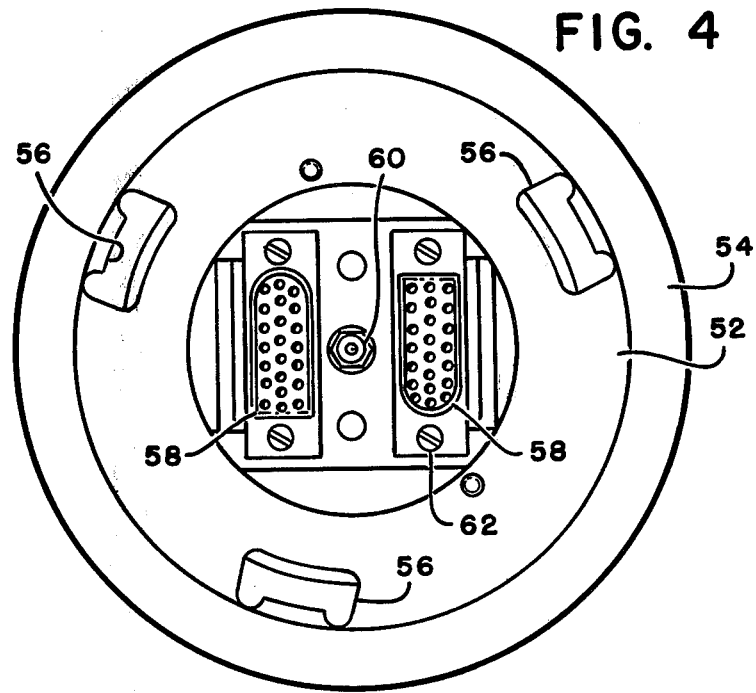
FIG. 4 shows a vehicle interface for the nose tip of FIG. 3.

FIG. 4 shows the reentry vehicle's interface to the nose tip assembly. An interface plate 52 secured to a vehicle 54 contains slots or apertures having edges 56. The hooked tangs 38 insert through these slots to attach the nose tip to the vehicle. Nose tip ring 40 is rotated by turning shaft 14 to move the beveled surfaces 42 of the hooks 36 on the tangs 38 across the beveled flanges 32 on the lock ring 28 to tighten the nose tip to the vehicle. In the preferred embodiment, these surfaces are helical cam surfaces.

the tangs and slots are precisely located so that the nose tip can be mounted on the vehicle in only one position. This insures only one possible blind connection between the connectors 58 and 60 on the vehicle 54 and nose tip connectors 48 and 50 on nose tip assembly 44. Connectors 58 may be mounted to the vehicle in any manner known to those skilled in the art, but in the preferred embodiment shoulder screws 62 that permit a limited float of connectors 58 as shown in FIG. 4 are used. Connector 60 is also float mounted in conjunction with the use of a shoulder nut 63 to permit limited movement or float. This connector float is necessary to permit final alignment as the connectors mate or assemble.

Figure 2:
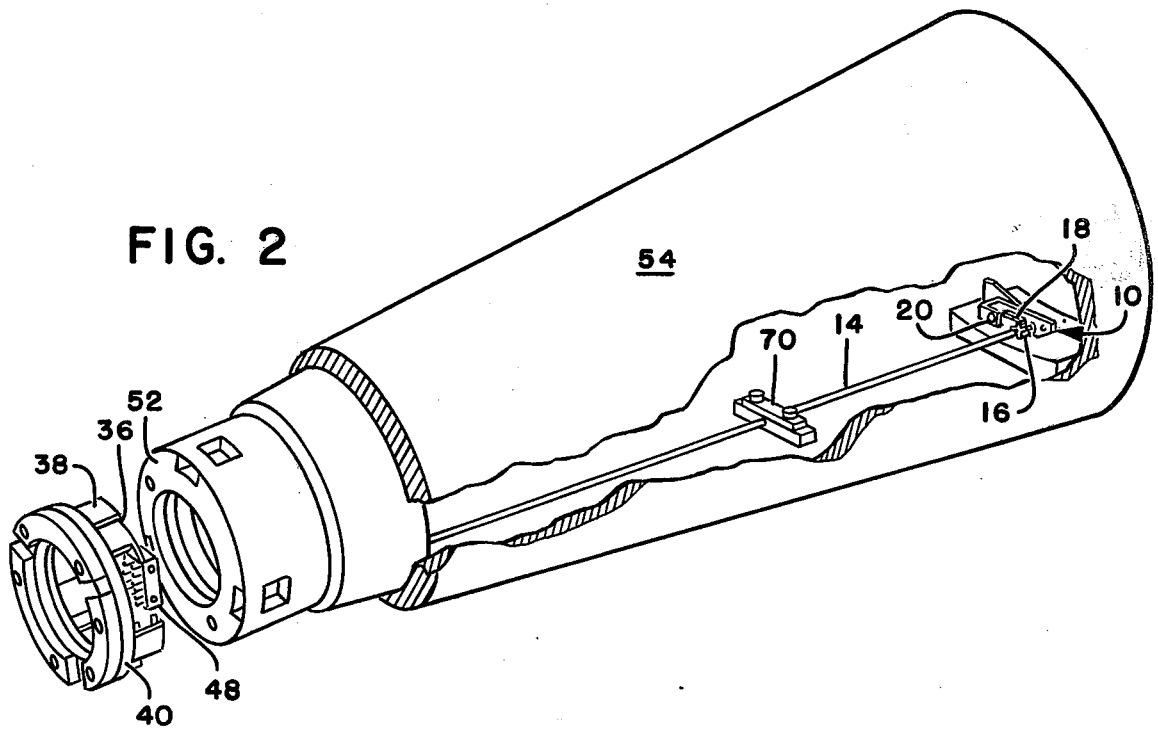
FIG. 2 shows more of the apparatus of a FIG. 1.
Figure 6:
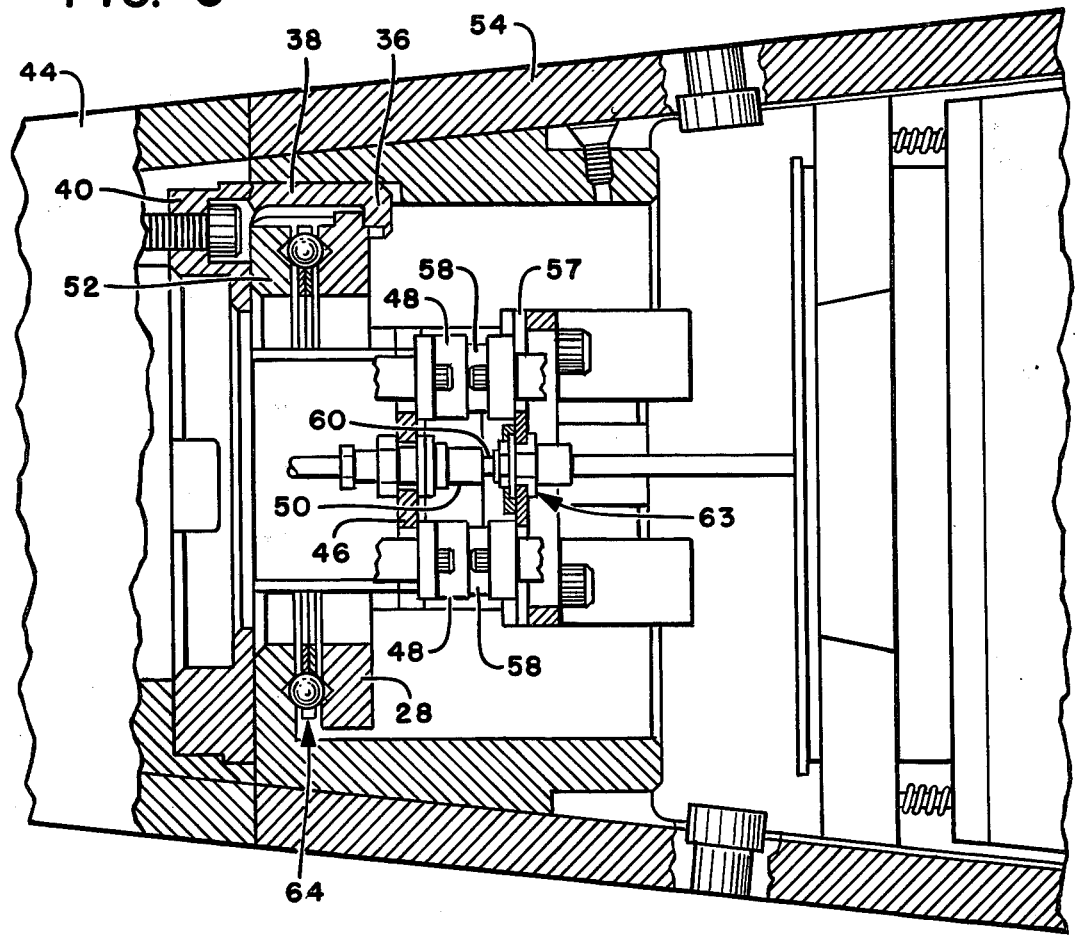
FIG. 6 shows a cross-sectional view of the lock assembly.

As seen in FIG. 6, lock ring 28 is ball bearing mounted on a bearing assembly 64 and, being gear driven, provides a mechanical advantage or force multiplication for locking and unlocking the nose tip from the vehicle. Lock ring 28 is rotated by shaft 14 extending the full length of the reentry vehicle 54, parallel to the conical inside surface thereof, as seen in FIG. 2. The pinion 24 and gear 26 are beveled to operate at a non-normal greater than 90° angle of intersection necessary because of the conical shape of the reentry vehicle.

When the nose tip is locked to the vehicle, torque shaft 14, tightened to a preselected torque, acts as a torsion spring in a slight s-bend to maintain the locking mechanism in firm engagement, elastically loaded to retain the nose tip to vehicle interface joint unopenable in flight from tensile, compressive and lateral or bending loads.

Access to the pawl shaft 20 and the pawl end of shaft 14 is provided through a removable cover (not shown) on the reentry vehicle. Thus, an operator can lock and unlock the nose tip while separated by some distance and perhaps by shielding from the aft end of the vehicle and hence the radioactive nose tip.

In operation, a nose tip assembly 44, equipped with a nose tip ring 40 is mated to a vehicle interface plate 52 by inserting its tangs 38 into corresponding slots having walls 56 on plate 52. Electrical connectors 48 and 50 on nose tip 44 automatically engage correctly with mating electrical connectors 58 and 60 in vehicle 54. Shaft 14 is rotated to cause the beveled flanges 30 on lock ring 28 to rotate by gear action of pinion 24 on gear 26. Lock ring 28 rotates on bearing assembly 64 which itself rotates on interface plate 52 of vehicle 54. The helically cammed beveled flanges 30 engage the complementary beveled surfaces 42 on hooks 36 of tangs 38. As shaft 14 rotates and torque resistance increases at the aft end of the shaft, pawl 18 in pawl assembly 10 holds the ratchet 16 and hence shaft 14 in place to maintain a torsional loading on the shaft, and pressure on the gear teeth thereby maintaining pressure on the beveled surfaces 32 and 42. This causes tension load in tangs 38 which forces nose tip assembly 44 tightly to the vehicle. Shaft 14 is torqued to a predetermined value to cause it to function as a torsion bar spring.

As shown in FIG. 1, shaft 14 is retained in position in vehicle 54 by a pillow block assembly 66 which encircles a shoulder 68 on the shaft to limit axial movement thereof. An intermediate support 70 keeps shaft 14 from improperly flexing or bowing, guiding it into a slight s-bend under appropriate torque.

Accurate blind mating of the electrical connectors is provided by precision fixing and bonding female shell connectors 48 and 50 on raised platform 46. Male shell connectors 58 and 60 are permitted a predetermined amount of float by using shoulder screws 62 and shoulder nut 63 to mount them to the vehicle, as seen in FIG. 6.

To disassemble the nose tip-vehicle combination, the torque on shaft 14 is increased to relieve the locking load on pawl 18. Pawl shaft 20 is then rotated to lift the pawl 18 off ratchet 16 and shaft 14 is counter rotated until rotation stops. This clears the beveled flanges 30 from the beveled surfaces 42 of tang hooks 36 and permits mechanical and electrical separation of nose tip assembly 44 from vehicle 54.

The various features and advantages of the invention are thought to be clear from the foregoing description. However, various other features and advantages not specifically enumerated will undoubtedly occur to those versed in the art as likewise will many variations and modifications of the embodiment illustrated herein, all of which may be achieved without departing from the spirit and scope of the invention as defined by the appended claims.

We claim:

1. A mechanism for releasably locking a nose tip to a vehicle comprising:
    a shaft having first and second ends, the first end of said shaft comprising a ratchet and the second end of said shaft comprising a pinion;
    means comprising a pawl, operably connected to said first end of said shaft, for engaging said ratchet, said ratchet being turnable in only one direction while engaged with said pawl, but being turnable in the other direction when said pawl and said ratchet are out of contact; and
    means for releasably locking said nose tip operably connected to said pinion on said shaft.

2. The invention of claim 1 wherein said nose tip locking and releasing means comprises a gear and lock ring engaged with said pinion, said nose tip comprises a nose tip ring having a plurality of tangs, said lock ring and said tangs being mutually engageable to secure said nose tip ring.

3. The invention of claim 2 wherein said tangs comprise locking surfaces which slant with reference to the surface plane of the nose tip ring and said lock ring comprises slanting surfaces slideably engageable with said slanting surfaces of said tangs.

4. The invention of claim 3 wherein said shaft, when turned in said one direction, causes said slanting surfaces to slide across one another to tighten said nose tip ring to said lock ring.

5. The invention of claim 4 wherein said shaft achieves a desired s-bend when said nose tip ring and said lock ring are torqued to a preselected locking tension thereby.

* * * * *